(12) United States Patent
Rehmattullah

(10) Patent No.: US 8,983,931 B2
(45) Date of Patent: Mar. 17, 2015

(54) INDEX-BASED EVALUATION OF PATH-BASED QUERIES

(75) Inventor: Mohyuddin Rehmattullah, Fremont, CA (US)

(73) Assignee: Sybase, Inc., Dublin, CA (US)

( * ) Notice: Subject to any disclaimer, the term of this patent is extended or adjusted under 35 U.S.C. 154(b) by 216 days.

(21) Appl. No.: 13/305,931

(22) Filed: Nov. 29, 2011

(65) Prior Publication Data

US 2013/0138629 A1    May 30, 2013

(51) Int. Cl.
*G06F 17/30* (2006.01)

(52) U.S. Cl.
CPC .................. *G06F 17/30911* (2013.01)
USPC ........... 707/716; 707/693; 707/696; 707/715; 707/736; 707/778; 715/239; 717/114

(58) Field of Classification Search
CPC ..................... G06F 17/30929; G06F 17/30911; G06F 17/30938
USPC ........... 707/693, 736, 802, 999.001, 999.003, 707/696, 715, 716, 778, 803; 715/239; 717/114
See application file for complete search history.

(56) References Cited

U.S. PATENT DOCUMENTS

| | | | |
|---|---|---|---|
| 6,799,184 B2 | 9/2004 | Bhatt et al. | |
| 7,493,305 B2* | 2/2009 | Thusoo et al. | 1/1 |
| 7,836,098 B2* | 11/2010 | Baby et al. | 707/803 |
| 8,290,977 B2* | 10/2012 | Chinchwadkar et al. | 707/778 |
| 2005/0068207 A1* | 3/2005 | Su et al. | 341/63 |
| 2006/0053122 A1* | 3/2006 | Korn et al. | 707/100 |
| 2006/0167869 A1* | 7/2006 | Jones | 707/4 |
| 2006/0167907 A1* | 7/2006 | Jones | 707/100 |
| 2010/0312756 A1* | 12/2010 | Zhang et al. | 707/693 |
| 2010/0325169 A1 | 12/2010 | Loh et al. | |
| 2011/0131200 A1 | 6/2011 | Zhou et al. | |

OTHER PUBLICATIONS

Bray et al., "Extensible Markup Language (XML) 1.0—W3C Recommendation," W3C.org, last accessed on Apr. 2, 2012 at http://www.w3.org/TR/2000/REC-xml-20001006, Second Edition, Oct. 6, 2000.

Berglund et al., "XML Path Language (Xpath) Version 2.0—W3C Recommendation," W3C.org, last accessed on Apr. 2, 2012 at http://www.w3.org/TR/2007/REC-xpath20-20070123/, Jan. 23, 2007.

Information Technology—Database Languages—SQL—Parts 1-5, published by the American National Standards Institute as American National Standard INCITS/ISO/IEC 9075-(1-5)-1999.

Date, C.J., "An Introduction to Database Systems, Seventh Edition," Part I, Chapters 1-4, Addison Wesley, 2000.

Office Action mailed Dec. 5, 2011, in U.S. Appl. No. 12/488,358, Loh et al., filed Jun. 19, 2009.

Office Action mailed Oct. 3, 2011, in U.S. Appl. No. 12/628,458, inventors Zhou et al, filed Dec. 1, 2009.

Office Action mailed Jun. 26, 2012, in U.S. Appl. No. 12/488,358, Loh et al., filed Jun. 19, 2009.

Office Action mailed Jun. 6, 2012 in U.S. Appl. No. 12/628,458, inventors Zhou et al, filed Dec. 1, 2009.

\* cited by examiner

*Primary Examiner* — Dennis Truong
(74) *Attorney, Agent, or Firm* — Sterne, Kessler, Goldstein & Fox P.L.L.C.

(57) ABSTRACT

Systems, methods, and computer program product embodiments are provided for path-based query evaluation. The embodiments include representing a markup language document as a descriptive catalog, and capturing relationships in the descriptive catalog as an index summary. The index summary is utilized for evaluating a path-based query.

20 Claims, 11 Drawing Sheets

600

| Pathid | Path | ParentPathid | Type | Sym | Nodes |
|---|---|---|---|---|---|
| 0 | / | 0 | Root | / | 0 |
| 1 | /bookstore | 0 | Element | bookstore | 1 |
| 2 | /bookstore/book | 1 | Element | book | 2,13,24 |
| 3 | /bookstore/book/@publisher | 2 | Attribute | @publisher | 14,3,25 |
| 4 | /bookstore/book/@sn | 2 | Attribute | @sn | 4,15,26 |
| 5 | /bookstore/book/author | 2 | Element | author | 7,18,29 |
| 6 | /bookstore/book/author/@rating | 5 | Attribute | @rating | 19,8 |
| 7 | /bookstore/book/author/fname | 5 | Element | fname | 9,20,30 |
| 8 | /bookstore/book/author/fname/syb_value | 7 | Text | syb_value | 31,21,10 |
| 9 | /bookstore/book/author/lname | 5 | Element | lname | 11,22,32 |
| 10 | /bookstore/book/author/lname/syb_value | 9 | Text | syb_value | 12,23,33 |
| 11 | /bookstore/book/title | 2 | Element | title | 5,16,27 |
| 12 | /bookstore/book/title/syb_value | 11 | Text | syb_value | 28,17,6 |

FIG. 6

| Pathid | PiKids | PiKidsCnt | PiNext |
|---|---|---|---|
| 0 | 1 | 1 | 13 |
| 1 | 2 | 1 | 13 |
| 2 | 3,4,5,11 | 4 | 13 |
| 3 | - | 0 | 4 |
| 4 | - | 0 | 5 |
| 5 | 6,7,9 | 3 | 11 |
| 6 | - | 0 | 7 |
| 7 | 8 | 1 | 9 |
| 8 | - | 0 | 9 |
| 9 | 10 | 1 | 11 |
| 10 | - | 0 | 11 |
| 11 | 12 | 1 | 13 |
| 12 | - | 0 | 13 |

INDEX-BASED EVALUATION OF PATH-BASED QUERIES

FIELD OF THE INVENTION

The present invention relates generally to data processing environments and, more particularly, to a database system providing methodology for index-based evaluation of path-based queries requesting data from markup language documents.

BACKGROUND

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially, Chapters 1-4), Addison Wesley, 2000.

In recent years, applications running on database systems frequently provide for business-to-business or business-to-consumer interaction via the Internet between the organization hosting the application and its business partners and customers. Today, many organizations receive and transmit considerable quantities of information to business partners and customers through the Internet. A considerable portion of the information received or exchanged is in Extensible Markup Language or "XML" format. XML is a pared-down version of SGML (Standard Generalized Markup Language), designed especially for Web documents, which allows designers to create their own customized tags, enabling the definition, transmission, validation, and interpretation of data between applications and between organizations. For further description of XML, see e.g., "Extensible Markup Language (XML) 1.0" (Second Edition, Oct. 6, 2000) a recommended specification from the W3C, the disclosure of which is hereby incorporated by reference. A copy of this specification is available via the Internet (e.g., currently at www.w3.org/TR/2000/REC-xml-20001006). Many organizations utilize XML to exchange data with other remote users over the Internet.

Given the increasing use of XML in recent years, many organizations now have considerable quantities of data in XML format, including Web documents, newspaper articles, product catalogs, purchase orders, invoices, and product plans. As a result, these organizations need to be able to efficiently store, maintain, and use this XML information in an efficient manner. However, this XML data is not in a format that can be easily stored and searched in current database systems. Most XML data is sent and stored in plain text format. This data is not formatted in tables and rows like information stored in a relational DBMS. To search this semi-structured data, users typically utilize keyword searches similar to those utilized by many current Internet search engines. These keyword searches are resource-intensive and are not as efficient as relational DBMS searches of structured data.

Organizations with data in XML format also typically have other enterprise data stored in a structured format in database management systems. Increasingly, database system users are demanding that database systems provide the ability to access and use both structured data stored in these databases, as well as XML and other unstructured or semi-structured data. In addition, users desire flexible tools and facilities for performing searches of this data.

One of the key roles of a database management system (DBMS) is to retrieve data stored in a database based on specified selection criterion. This typically involves retrieving data in response to a query that is specified in a query language. One current solution used in XML-based applications to query the contents of an XML document is XPath. XPath provides basic facilities for manipulation of strings, numbers and booleans. It uses a compact, non-XML syntax to facilitate use of XPath within URIs and XML attribute values. XPath operates on the abstract, logical structure of an XML document, rather than its surface syntax. XPath gets its name from its use of a path notation as in URLs for navigating through the hierarchical structure of an XML document. For further description of XPath, see e.g., "XML Path Language (XPath) Version 2.0" (Jan. 23, 2007), a recommended specification from the W3C, the disclosure of which is hereby incorporated by reference. A copy of this specification is available via the Internet (e.g., currently at http://www.w3.org/TR/XPath20/).

The XPath query language is commonly used in Extensible Stylesheet Language Transformations (XSLT) to locate and to apply XSLT templates to specific nodes in an XML document. In general, an XPath expression specifies a pattern that selects a set of XML nodes. Thus, XPath queries are commonly used to locate and to process nodes in an XML document that match a specified criteria.

For example, a simple XPath query may take a form such as /A/B/C to select C elements that are children of B elements that are children of the A element that forms the outermost element of the XML document. Selection may take on a more complex form, however, with construction of complex XPath expressions. More complex XPath expressions can be constructed, such as by containing other XPath query language constructs, e.g., filter, functions, parenthesis, union, intersection, etc., specifying an axis other than the default 'child' axis, a node test other than a simple name, or predicates. For example, the complex XPath expression A//B/*[1] should return the first element (as designated by the use of '[1]'), with any name (as designated by the use of '*'), that is a child ('/') of a B element that itself is a child or other deeper descendant ('//') of an A element that is a child of the current context node (the expression does not begin with a '/'). When there are several suitable B elements in the document, a set of all their first children needs to be returned.

While XPath has been used as the query language for XML documents with some success, complex XPath querying is not handled effectively in current XML processing engines. One particular need is for a solution that will enable efficient and accurate searches of information in XML documents when queried using complex expression. The present invention addresses this need.

BRIEF SUMMARY

Briefly stated, the invention includes system, method, computer program product embodiments and combinations and sub-combinations thereof for path-based query evaluation. The embodiments include representing a markup language document as a descriptive catalog, and capturing relationships in the descriptive catalog as an index summary. The index summary is utilized for evaluating a path-based query.

Further embodiments, features, and advantages of the invention, as well as the structure and operation of the various embodiments of the invention, are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 6 illustrates an example descriptive path index catalog of the example XML document of FIG. 4.

Figure 1:
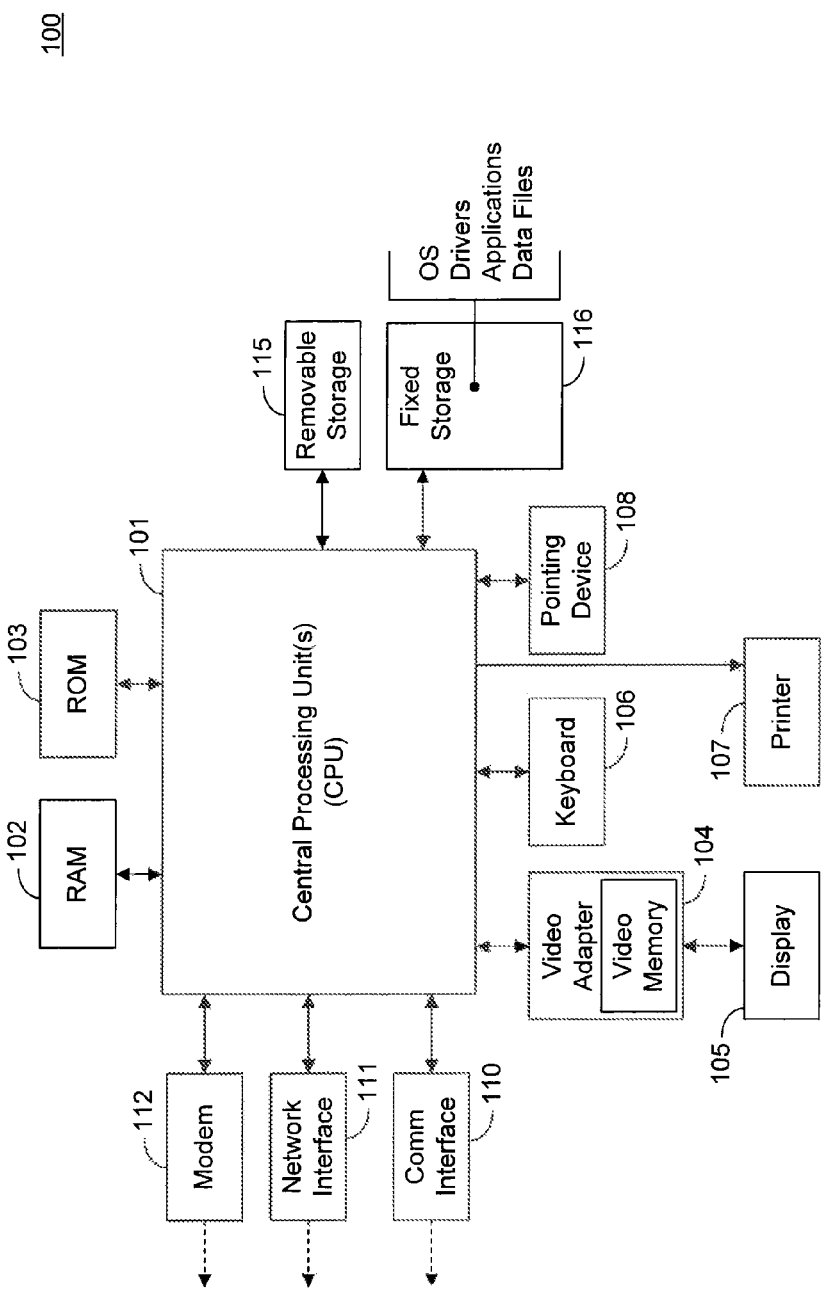
FIG. 1 is a very general block diagram of a computer system (e.g., an IBM-compatible system) in which software-implemented processes of the invention may be embodied.

The features and advantages of the present invention will become more apparent from the detailed description set forth below when taken in conjunction with the drawings.

DETAILED DESCRIPTION

While embodiments are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Glossary

The following definitions are offered for purposes of illustration, not limitation, in order to assist with understanding the discussion that follows.

ASE: Sybase® Adaptive Server® Enterprise, an enterprise relational database system available from Sybase, Inc. of Dublin, Calif.

HTML: HTML stands for HyperText Markup Language, the authoring language used to create documents on the World Wide Web. HTML defines the structure and layout of a Web document by using a variety of tags and attributes.

Node: In the context of a markup language document (e.g., an XML document), a node corresponds to an element or value in the markup language document. Unlike conventional data in a database (e.g., relational database) which is maintained in a flat structure, information in a markup language document (e.g., XML document) can be represented as a tree structure. The tree structure of an XML document is generated by transforming each element or value in the XML document into a node in the tree.

Path scan: A path scan returns identifiers of all the nodes that follow a given XPath. In the system of the present invention, a path scan invokes services of a store layer.

Physical query operator (operator): One step in an execution plan is called an operator. The implementation of the execution for one step in the plan (operator) is called the "physical" operator.

Query: A request for information from a database. A database query is typically written in a database query language, which is a language enabling database users to interactively formulate requests and generate reports. One of the best known query languages is the Structured Query Language (SQL).

Query engine: A query engine is a significant component of a DBMS, which in the currently preferred embodiment of the present invention is comprised of the following sub-components: a parser, a normalization engine, an optimizer/compiler, and an execution engine. The parser converts query text to a query tree and imposes syntactic correctness. The normalization engine enforces semantic correctness by validating the correctness of information in the query. It also transforms the query into an operator tree or query that is in a form which facilitates processing by other sub-components of the query engine. An optimizer chooses the best among various alternative plans for executing a query. A compiler generates another structure that enumerates the specific execution steps in the appropriate order of execution. In this document the XML engine optimizer and compiler are together referred to as the optimizer, unless otherwise indicated. The execution engine is a virtual machine within a DBMS that interprets the "plan language". The execution engine executes all the sub-commands necessary to execute the query and return results.

Query plan: A query plan (execution plan or "plan") is an in-memory data-structure which contains the specific steps (operations) and order of execution for a given query. A query plan is written in a language that the execution engine understands.

Query processing: All phases of query evaluation, parsing, normalization, optimization/compilation, execution, and result generation, together are termed as "query processing". The life of a query includes all of these phases.

Query tree: A query tree is an in-memory data-structure which represents a query. Initially, it is a mirror of "query text" in the form of an in-memory data-structure. It includes the same information as in the user query.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Storage layer: A storage layer is a component of a DBMS which provides services to the query engine such as running a scan and extracting data from disk to in-memory buffers, storing data from in-memory buffers to disk, and so forth.

URL: URL is an abbreviation of Uniform Resource Locator, the global address of documents and other resources on the World Wide Web. The first part of the address indicates what protocol to use, and the second part specifies the IP address or the domain name where the resource is located.

XML: XML, stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations.

XPath: XPath is a query language for querying data in XML documents. The XPath query language is commonly used in Extensible Stylesheet Language Transformations (XSLT) to locate and to apply XSLT templates to specific nodes in an XML document. XPath queries are also commonly used to locate and to process nodes in an XML document that match a specified criteria. XPath provides basic facilities for manipulation of strings, numbers, and booleans. It uses a compact, non-XML syntax to facilitate use of XPath within URLs and XML attribute values. XPath operates on the abstract, logical structure of an XML document, rather than its surface syntax. X Path gets its name from its use of a path notation as in URLs for navigating through the hierarchical structure of an XML document.

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method act and an apparatus element for performing the method act. Depending upon the implementation, the corresponding apparatus element may be configured in hardware, software, firmware, or combinations thereof.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor, such as one of the Intel Pentium family of microprocessors or any other suitable processor that may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Random-access memory (RAM) 102 serves as the working memory for the CPU 101. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology (computer-readable media). The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a display device, such as a cathode ray tube (CRT) raster or liquid crystal display (LCD) monitor. A hard copy of the displayed information, or other information within the system 100, may be obtained from the printer 107, or other output device.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN DSL, or cable modem). The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

Figure 2:
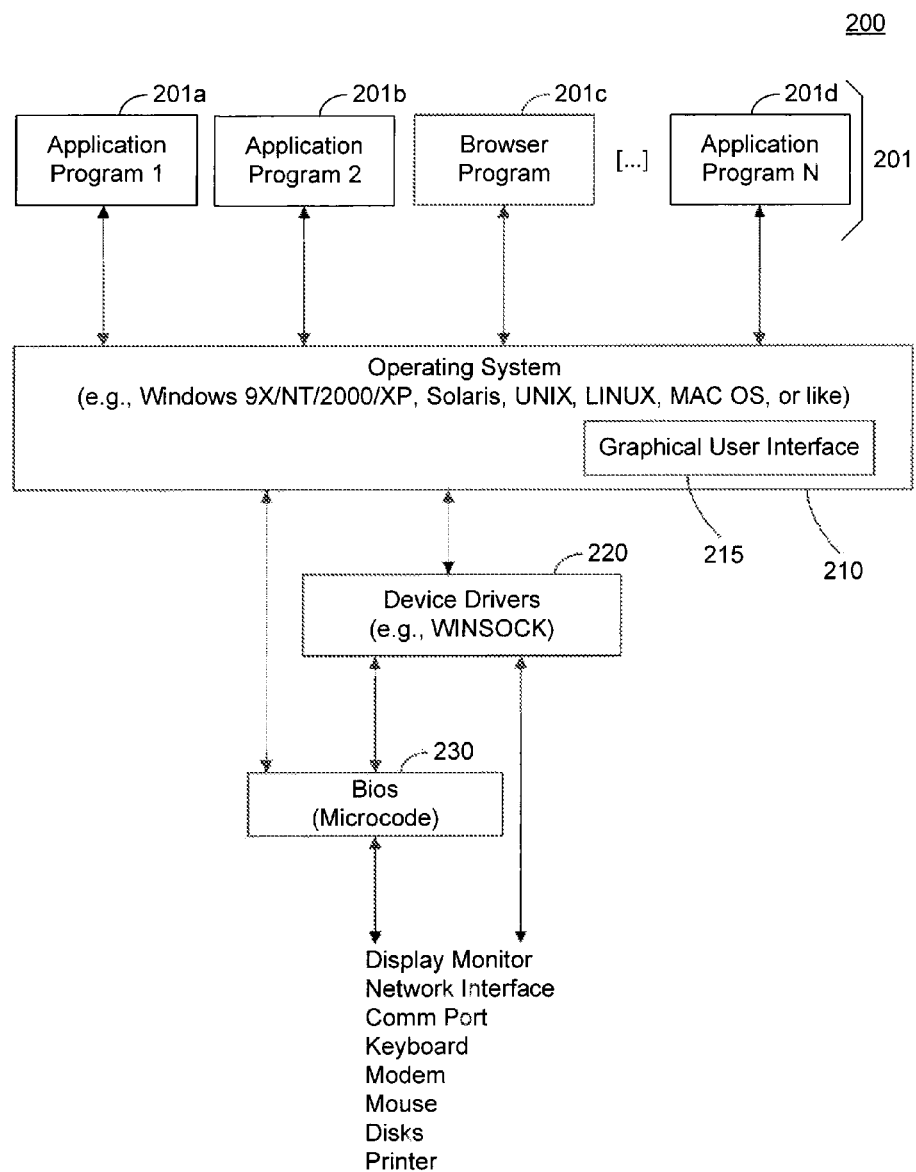
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in tarn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft (registered trademark) Windows 9x, Microsoft (registered trademark) Windows NT, Microsoft (registered trademark) Windows 2000, or Microsoft (registered trademark) Windows XP, all available from Microsoft Corporation of Redmond, Wash. Alternatively, OS 210 can also be an alternative operating system, such as the previously mentioned operating systems.

Figure 3:
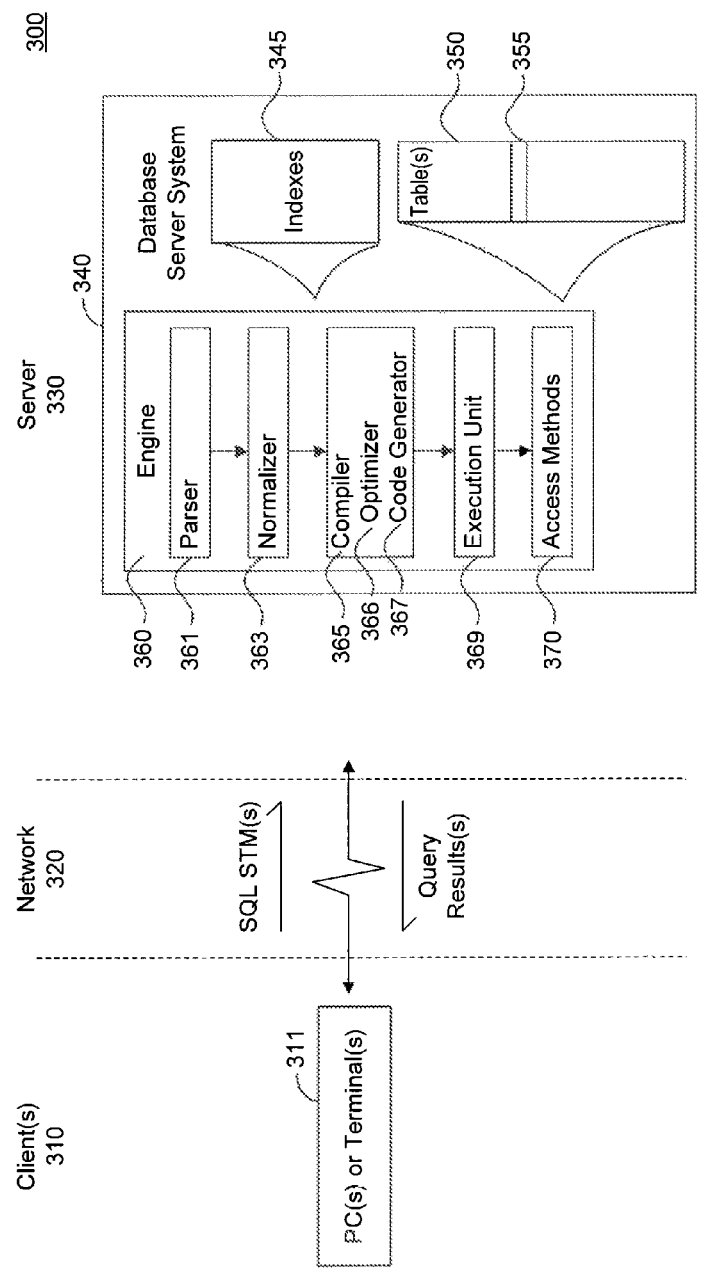
FIG. 3 illustrates the general structure of a client/server database system suitable for implementing the invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft (registered trademark) Windows client operating system (e.g., Microsoft (registered trademark) Windows 95/98, Windows 2000, or Windows XP).

The database server system 340, which comprises Sybase (registered trademark) Adaptive Server (registered trademark) Enterprise (available from Sybase, Inc. of Dublin, Calif.) in an exemplary embodiment, generally operates as an independent process (i.e., independently of the clients), running under a server operating system such as Microsoft (registered trademark) Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3) A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of SQL. SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and access methods 370. Specifically, the SQL statements are passed to the parser 361 which converts the statements into a query tree (a binary tree data structure) which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages reside that have been read from disk is called the cache or buffer pool.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The following discussion also uses examples of queries requesting information from XML documents stored in a database system; however, the present invention may also be used in conjunction with documents written in various other markup languages, including, but not limited to, cHTML, HTML, and XHTML. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

The present invention comprises a system providing methodology for index-based evaluation of path-based queries requesting data from markup language documents. The following discussion focuses on an XML document; however the system and methodology of the present invention may also be used for other types of markup language or tag-delimited sources of information. Accordingly, the references to XML in the following discussion are used for purposes of illustration and not limitation.

XML is a widely accepted model for representing data. In recent years, XML has become pervasive both in representing stored data and communicating data over a network. The following discussion illustrates the operations of the present invention using several examples of an XML document including books in a bookstore.

Unlike conventional data in a relational database which is maintained in a flat structure, information in an XML document is usually maintained in a tree structure.

Figure 4:
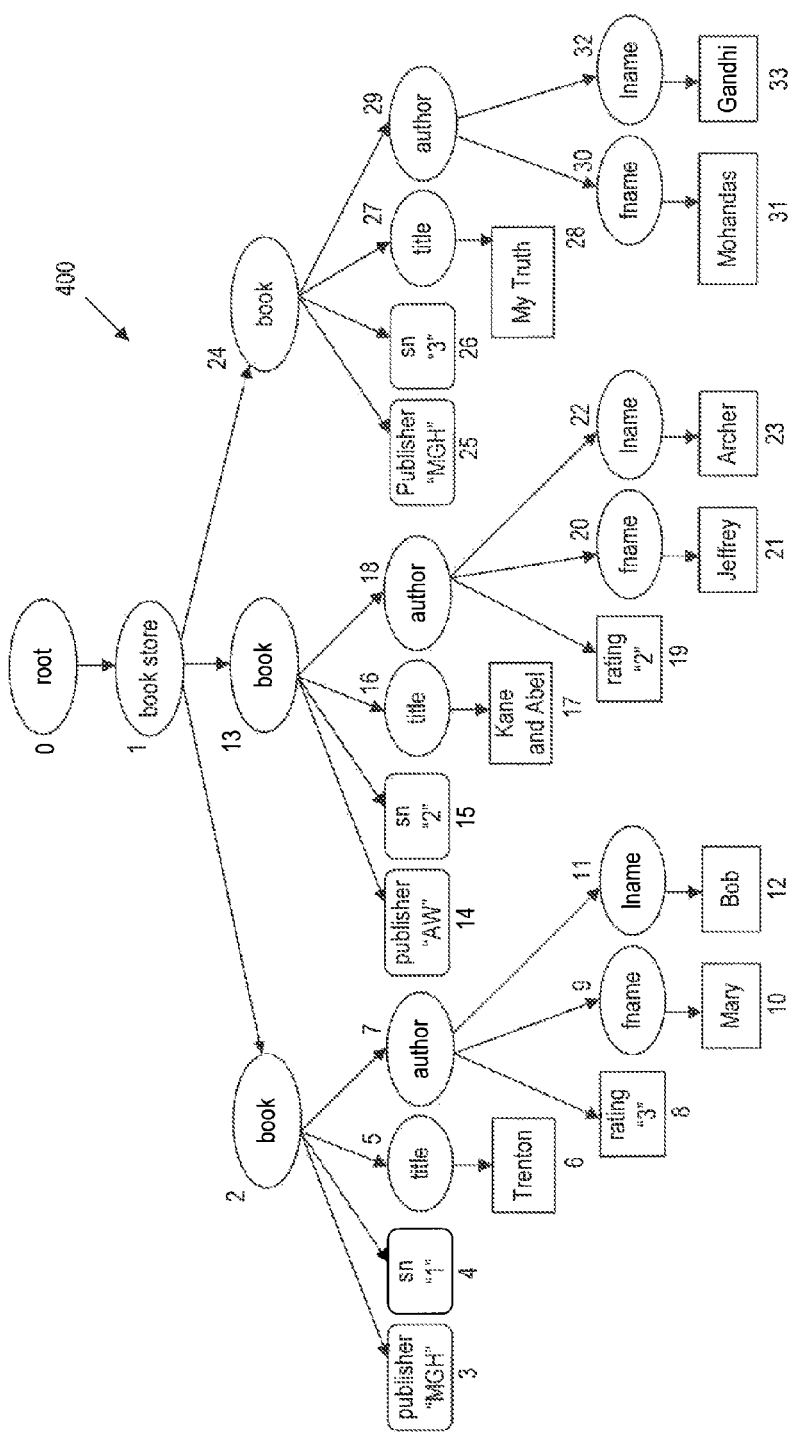
FIG. 4 is a block diagram illustrating a tree representation of an XML document.

FIG. 4 is a block diagram illustrating a tree representation 400 of an example XML document. As shown at FIG. 4, each element or value (e.g., bookstore, book, title, etc.) in the XML document has been converted to a node in the tree. These nodes are numbered in a pre-determined manner (1-33 in FIG. 4). The number corresponding to each node is called a "node id" of the element or tree node. This concept of node id is important in XML query processing. As shown, nodes of the tree include a bookstore and books. Children nodes of the books provide access to additional information regarding each book, e.g., title, title data value, author, author first and last name and data values, rating data values, publisher data values, and serial number data values.

As previously described, XPath is a query language for querying data in XML documents. XPath consists of a series of step specifications separated by a '/'. Each of the steps (location step) identifies a set of identities (e.g., elements or attributes) relative to a given context. The first '/' in the XPath directly refers to the root node of the document. An example of an XPath query for requesting data in the above example XML document is as follows:

/bookstore/book/title

An example of a SQL version of the above XPath query that can be used in the currently preferred embodiment of the system of the present invention is as follows:

{select xmlextract('/bookstore/book/title', xmlcol) from bookstoretable} where "xmlextract' represents a built-in function of ASE SQL to run the XPath query. The above XPath query would return the following answer based on the example XML document shown above:

Answer:<title>Trenton</title><title>Kane and Abel</title><title>MyTruth</title>
 Another example of an XPath query is:
 /bookstore/book[title='Trenton']/author
 A SQL version of this query is as follows:
  {select xmlextract('/bookstore/book[title='Trenton']/author/, xmlcol) from bookstoretable}

As shown, the above SQL query specifies the path from which data is to be selected (in the form select xmlextract (path)) as well as the column name (xmlcol) and table (bookstoretable). Also, in the above query the "[" operator (or "square bracket" operator) provides for filtering out books based on comparing the title of the book to 'Trenton'. This operator corresponds to a "where" clause in a SQL query. The value of the author of such books is then projected. The above query would return the following answer based on the example XML document shown above:

Answer: <author>Mary</author><author>Bob</author>

Figure 5:
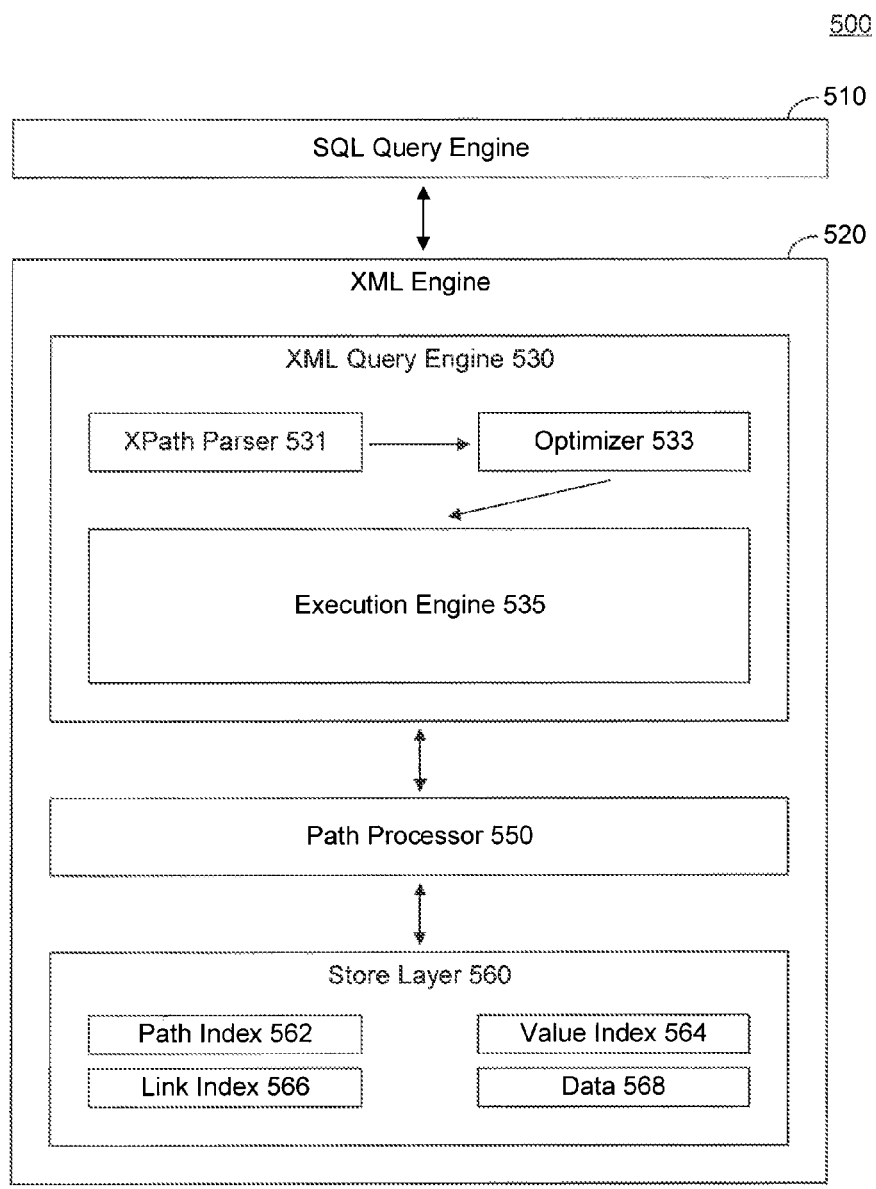
FIG. 5 is a block diagram illustrating an environment in which the invention may be implemented.

FIG. 5 is a block diagram illustrating an environment 500 in which such XPath queries can be performed and the present invention may be implemented. The environment 500 includes an SQL Query Engine 510 and an XML Engine 520. The XML Engine 520 provides mechanisms for storage and retrieval of information in the XML format and includes transforming an XML document for storage in a database. As shown at FIG. 5, the XML Engine 520 includes as core components an XML Query Engine 530, a Path Processor 550, and a Store Layer 560. While the following provides a description of the environment 500 with the enhancements of the present invention, a description of known operations of the components can be found in commonly-owned U.S. Pat. No. 6,799,184 titled "Relational Database System Providing XML Query Support", which is incorporated by reference herein.

The Path Processor 550 serves as an interface between the XML Query Engine 530 and the Store Layer 560. The Path Processor 550 is an abstract API which accepts path requests from the XML Query Engine 530 and returns back node ids (corresponding to persisted nodes of the XML document). The Path Processor 550 invokes services of the Store Layer 560 to identify the nodes that satisfy the query expression (e.g., XPath expression) and returns an instance of an abstract object named "Dompp". This Dompp object is returned back to the query layer (i.e., XML Query Engine 530).

The Store Layer 560 of the XML Engine 520 converts the text representation into an internal representation which is efficient for storage. The Store Layer 560 is also responsible for converting the representation to its textual form when the Path Processor 550 (path processing layer) requests a certain piece of information during query processing.

The XML Engine 520 includes parse time functionality that transforms each XML document into a collection of bytes that can be stored in a database or file system. The XML Engine 520 transforms an XML document by analyzing the document as a tree. During the transformation process, each node is labeled uniquely by assigning an integer to each node in a monotonically increasing order. This integer is referred to as object ID or OID. During this process, each element of the source document is visited in turn, and each element is numbered based upon the order it occurs in the document. An object is created by the XML Engine 520 which contains data from the transformed document together with auxiliary structures to aid in faster access to the data. During the transformation process, each element of an XML document is treated as a node or leaf (i.e., terminal node) and these nodes and leaves are annotated to provide faster access to data. The structure of the tree itself is derived from the structure of the source document. Furthermore, a streaming interface over this data is defined to provide fast, random access to the structures within it. The streaming interface includes a fast access structure, which is a flexible interface that enables free movement amongst, and efficient access to the underlying XML data. The XML Engine 520 also has query execution-time functionality for retrieving data in response to queries.

The XPath portion of a query is handled by the XML Query Engine 530, which includes query execution-time functionality for retrieving data in response to queries. The XML Query Engine 530 includes an XPath parser 531, an optimizer 533, and an execution engine 535. Within the XML Query Engine 530, the XPath parser 531 parses the XPath portion of the query received from the SQL Query Engine 510 and converts it into a query tree representation. The XPath parser 531 includes a normalization module (not separately shown at FIG. 5) for normalization of the XPath expression. The query tree representation generated by the XPath parser 531 is then sent to the optimizer 533 which generates a physical query plan (execution plan) for execution of the query. The query plan is then provided to the execution engine 535 which interprets the query plan and executes it with the support of the store layer 560.

In a typical XML query engine evaluating a given XPath, all nodes satisfying each of the location steps beginning with the root are evaluated, and subsequently the remaining steps are evaluated relative to the results evaluated in the previous step. This tree traversal requires visiting intermediate nodes, which is not very efficient.

Further, in an ASE system example, for evaluation of complex Xpath queries over XML documents, the queries are broken down to a set of simple absolute paths (an absolute path being a sequence of nodes traversed from the root of the document to a given node). The results of these simple absolute paths (scans) are answered using a catalog containing a map of the absolute paths present in the XML document and the nodes subscribing to those paths. These results are then joined accordingly as per the logic of the query. This approach allows evaluation of complex Xpath that include the forward axes, such as self, child and descendent axes. However, evaluating queries with backward axes, like parent, ancestor or sibling is not possible using this approach alone.

In accordance with embodiments of the invention, an enhancement for an XML engine is provided to evaluate XPath queries, including reverse axes, efficiently using the catalog of paths and nodes mentioned above and additional auxiliary data structures built on top. Through the embodiments, relative path evaluation is enabled and done efficiently.

The evaluation of an XPath query against a given XML document in accordance with an embodiment occurs in three phases, namely Document Parsing, Plan Generation, and Plan Execution. In the Document Parsing phase, a given XML document is parsed and stored as a set of internal indices, referred to as the Store. These indices facilitate the efficient execution of the Plan for the given XPath, with a main index providing a descriptive catalog and referred to as the PathIndex.

Figure 7:
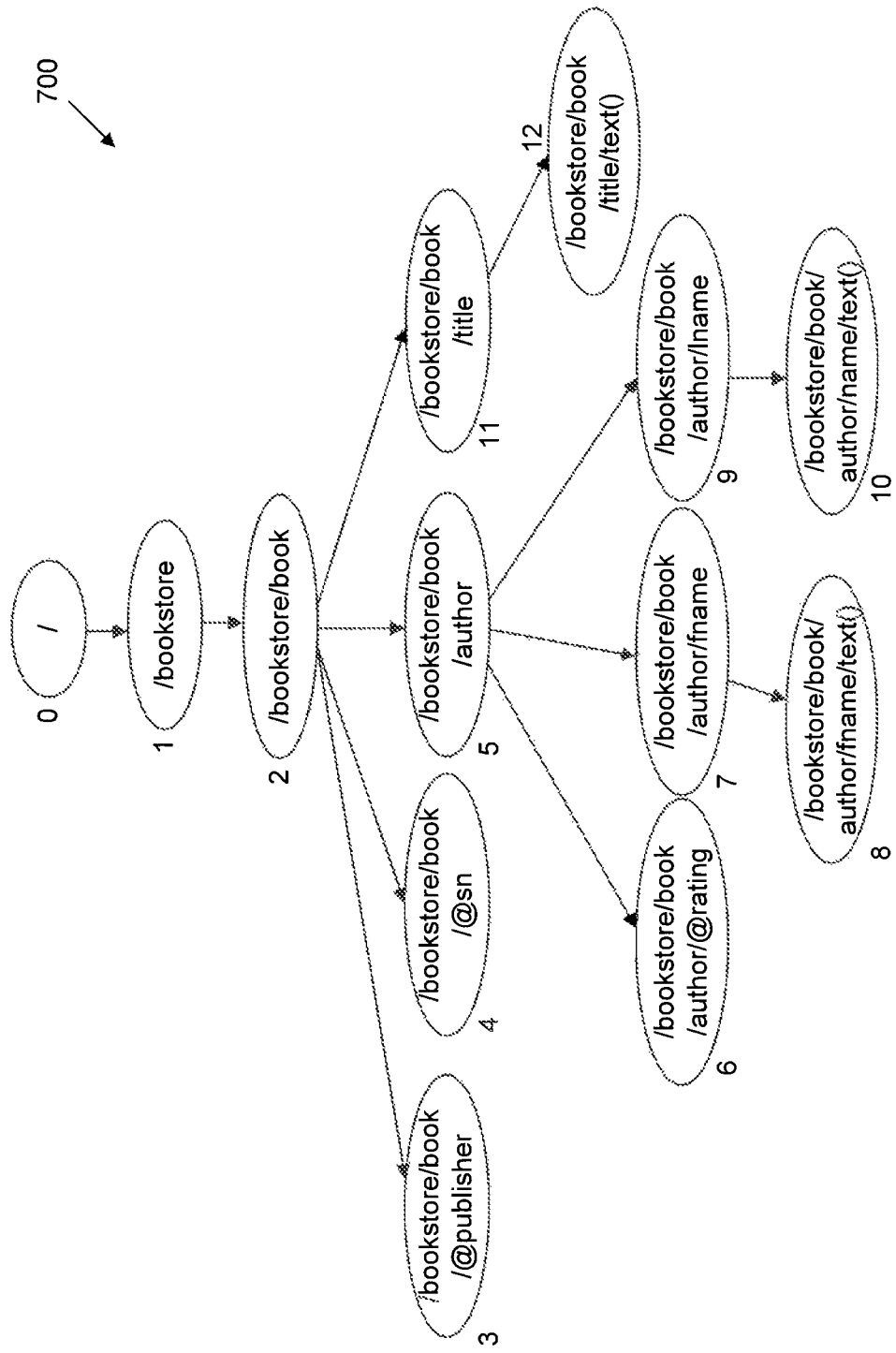
FIG. 7 illustrates an example tree representation of FIG. 6.

By way of example, a PathIndex 600 for the XML document of FIG. 4 is shown in FIG. 6 and a corresponding PathIndex tree 700 is shown in FIG. 7. Included in the PathIndex 600 for each path is a unique id for each path (PathId), a type of the path, e.g., root, element, attribute, text, (Type), names of the last node in each path (Sym), node ids corresponding to nodes that subscribe to each path in the document (Nodes), and the PathId of the parent of this path, i.e., the path without the last node in this path, (ParentPathid).

In ASE, for example, SAX (Simple API for XML) parsing is used to parse the XML document, and the PathIndex 600 gets generated during the callbacks of the SAX parsing. SAX parsing is a well known example of an event-based API (application programming interface), which is commonly understood to report parsing events (such as the start and end of elements) directly to the application through callbacks, and the application implements handlers to deal with the different events, as is well understood in the art.

Figure 8:
FIG. 8 illustrates an index summary of FIG. 7.

When the entire PathIndex 600 is generated, an additional summary index on the PathIndex 600 is built as the Path Index Summary. FIG. 8 illustrates an example Path Index Summary 800 for the PathIndex 600 of FIG. 6. In general, with the PathIndex 600 viewed as a tree 700, the Path Index Summary 800 captures the parent-child relationship in the tree 700. As shown in the example of FIG. 8, the Path Index Summary 800 includes two arrays, a PiKids array and a PiNext array. The PiKids array maps paths to their child paths, while the PiNext array maps each path to the next path (in lexical order) that is not a descendent of itself. If all subsequent paths are a descendent of a path, then its PiNext is set to MaxPaths, where MaxPaths refers to the number of paths in the document (13 for the example of FIG. 6).

With the document parsed, the Plan Generation phase commences and includes generally three sub-phases, nave plan generation, path resolution, and ParentOp processing. For naïve plan generation, the parse tree is walked and for each member, an execution plan operator (plan Op) is generated.

Figure 9:
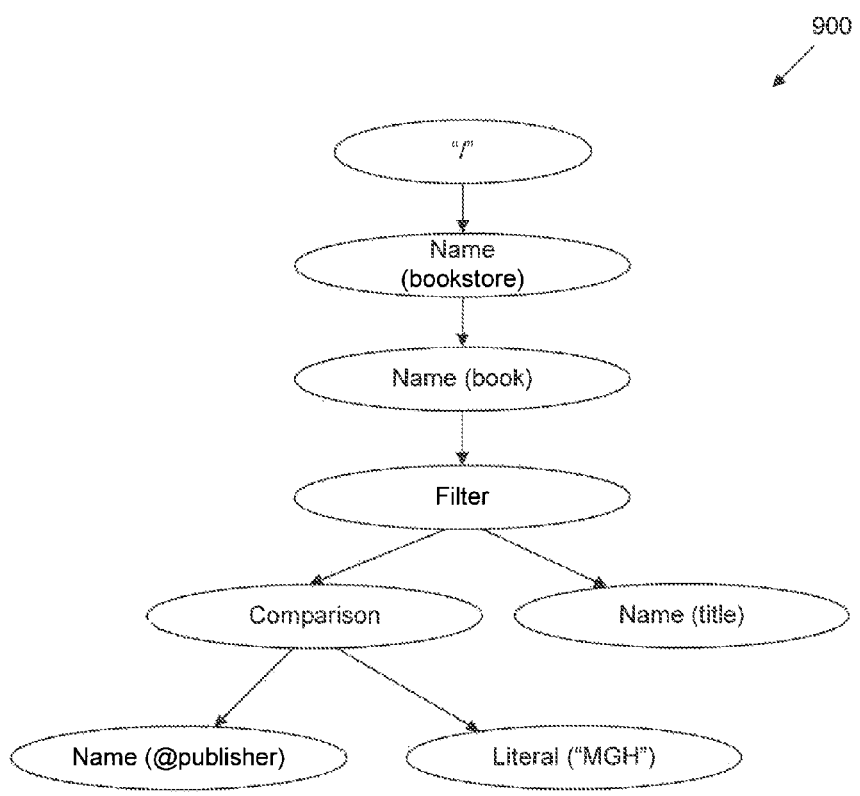
FIG. 9 illustrates a parse tree for an example query of the XML document of FIG. 4 in accordance with embodiments of the invention.
Figure 10:
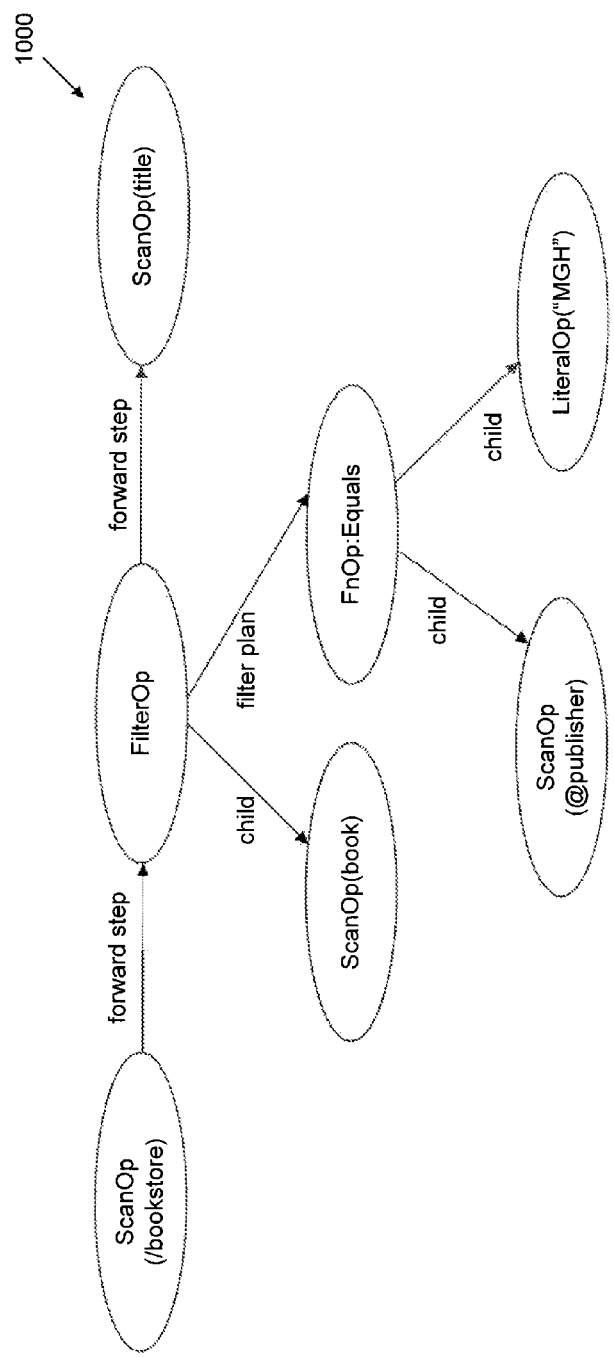
FIG. 10 illustrates an execution plan for the example query in accordance with embodiments of the invention.

By way of example, a parse tree 900 and execution plan 1000 as shown in FIG. 9 and FIG. 10, respectively, are generated for an example query, Query 1: /bookstore/book [@publisher='MGH']/title In generating the execution plan, an XPath NAME element corresponds to a ScanOp. An XPath Filter element corresponds to a FilterOp, an XPath Comparison element corresponds to a ComparisonOp, an XPath Set member corresponds to a SetOp, and an XPath Parent(reverse) element corresponds to a ParentOp. In an embodiment, each consecutive sequence of XPath NAMEs is concatenated into one simplepath, and a ScanOp is generated for the simplepath, where a simplepath refers to a contiguous sequence of child-nametest steps in the XPath. For example, '/bookstore/book' is a series of the following steps: root-child-nametest(bookstore)-child-nametest(book).

Further, after a plan Op is generated at any intermediate point, if there are further location steps remaining, then the plan for the remaining XPath becomes the forward step Op to the plan Op. If there is a Filter Op, then its previous step is added as the child of the Filter Op, and the plan for the XPath inside the filter is added as the filter plan for the Filter Op. The plan for any further forward location steps becomes the forward Step Op to the Filter Op.

With the naive plan generated, optimization for plan execution occurs with the path resolution sub-phase. By way of example, the following pseudocode provides a basic path resolution method for a ScanOp in accordance with embodiments of the invention.

```
pathresolve(pathid)
{
    pathexpand(pathid, simplepath) into absolute paths set s1.
    for each path p in s1
        call pathresolve(p) on the forward step operator.
        if forward-step returns an empty set then
            remove p from s1.
        cache [ pathid – s1] into an internal map
    return s1.
}
pathexpand(pathid, simplepath)
{
    P = { pathid }
    for each nametest n in simplepath
        for each path p in P
            P' = lookup PathIndex Summary to get list of child
                 paths to p matching n
            add P' to P1
        P= P1
    return P
}
```

As can be seen, the path resolution begins by passing the root path to the topmost operator in the plan as the context path. All the paths that would be relevant under the given path for itself are calculated, and each of these paths is then passed down to the forward step plan as the context path. The forward step plan does the path resolution recursively and returns its result paths. If the forward step does not return any result paths for the context path, the context path is discarded by the current operator. The remaining set of relevant paths for the current operator is then returned as the result paths by the operator.

For plan Ops other than a ScanOp, the absolute path set s1 would be obtained by merging the paths returned by the pathresolve( ) call to each of the child operators of the current operator. With the internal path representation having both path type (element, attribute, etc.) and also the name of the last element of the path, it is possible to match the names in each step of the simplepath while looking up the Path Index Summary.

All plan Ops, except ParentOp, return the results for each context node in 'document order' so as to support the expectation by each of the Operators that the context nodes are to be passed in incremental document order.

ParentOp can produce results out of order, as well as produce duplicates. To account for this, a SortDistinctOp operator is added over a ParentOp's operation. The SortDistincOp collects all the results for a given context node from its forward step operator (in this case ParentOp) and then sorts them, removes duplicates, and returns results in document order, as is well appreciated by those skilled in the art.

Figure 11:
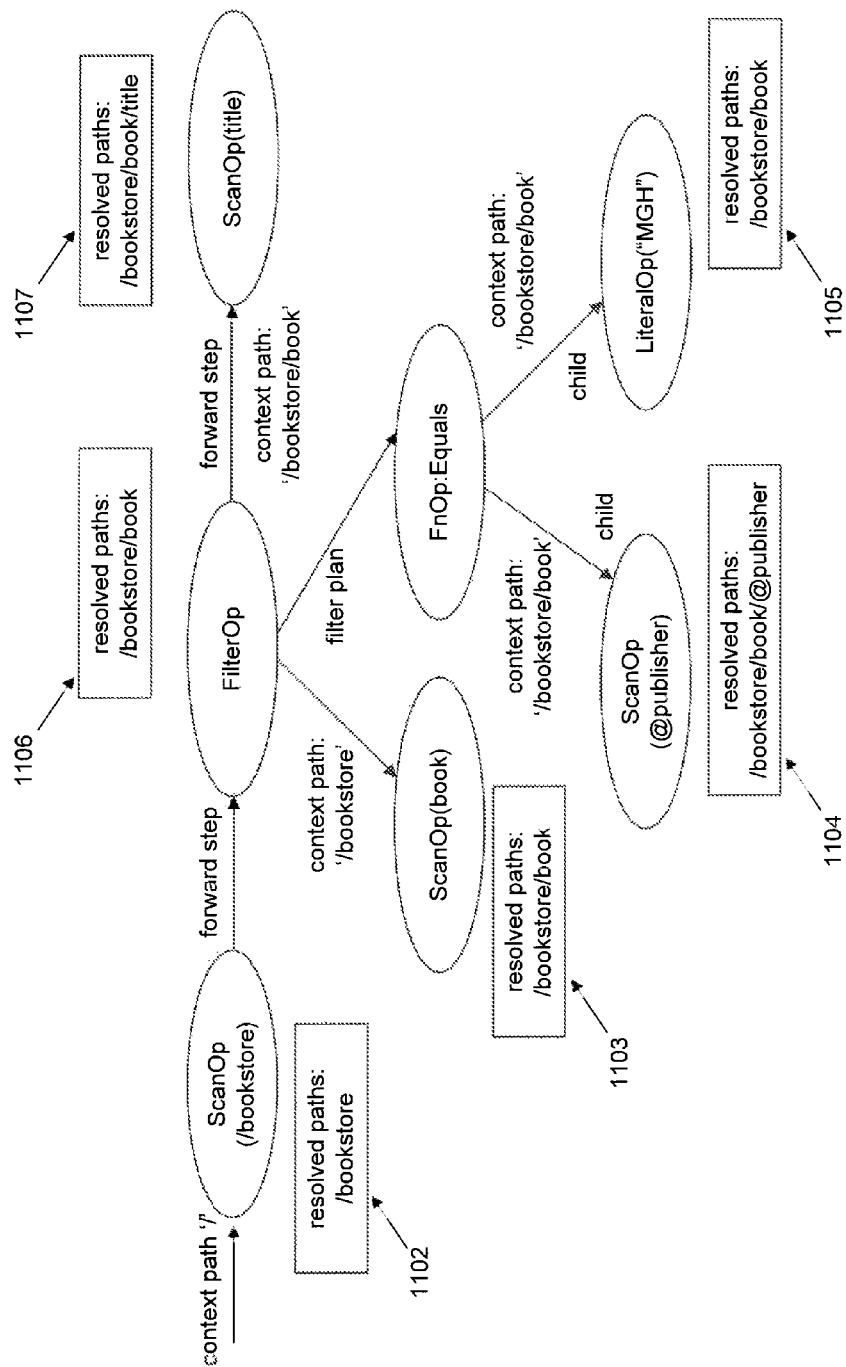
FIG. 11 illustrates context paths and final resolved paths resulting from path resolution for the example query.

FIG. 11 illustrates the diagram of FIG. 10 showing the context paths and final resolved paths resulting from the path resolution for the example query, where the order of resolved paths 1102, 1003, 1104, 1105, 1106, and 1107 follows the order of execution.

Through the optimization of the path resolution sub-phase to filter out all the unwanted paths at each operator before beginning evaluation of the results, a top down approach is supported by the embodiments of the invention, and for the subsequent Plan Execution phase, each operator only looks at relevant (i.e., potential result producing) paths in the PathIndex for each context node received, the relevant paths being stored in an associative map of the operator.

In accordance with embodiments of the invention, for the Plan Execution phase, the operators in the execution plan are recursively connected, with each operator having zero or more child subplans and the meaning of each child being different for each operator. For example, for SetOp, each of the child plans corresponds to the plan for each of the XPaths that the set operator operates on, and for FilterOp, the child plan corresponds to the plan within the predicates. Additionally, each operator has one internal method, a produce( ) method, to generate a local-result, and zero or one forward step plans.

At a top level, in an embodiment, the plan is executed as

```
top.open(root)
    while (top.next(root) is valid)
        repeat
``` where top is the topmost operator in the execution plan. In case of the aforementioned example, the topmost operator is the ScanOp('bookstore') operator with the relative path being 'bookstore', and so, the execution begins by calling ScanOp ('bookstore').open(root). Each of the operators provides the open(context) and next( ) interfaces to other operators above it in the plan, where the open(context) sets the context of evaluation for the operator, and the next( ) call obtains the next result of the operator.

Essentially, on each call to next( ) each operator produces its own result, referred to herein as local-result, relative to the context in the produce( ) method. With all operators having a same next( )method, and only the produce( )method being different for each, the next result of any operator may be evaluated as represented in the following:

```
next( )
{
    while ( not fstepresult.valid( ) )
    {
        if ( not fstepresult.ivalid( ) )
        {
            local-result = produce( )
            if (not local-result.valid( ) )
                return no-result.
            else
                forward-step.open(local-result)
                fstepresult=forward-step.next( )
        }
        else
        {
            while ( not fstepresult.valid( ) )
                fstepresult = forward-step.next( );
        }
    }
    return fstepresult
}
```

As can be seen, if there is no forward-step to a current operator, the local-result is returned as the result. However, if there is an forward-step to the current operator, a call is made to forward-step->next( ), passing the local-result as the context. The result returned from the forward-step is then returned as the result of the current operator. When next( ) is called again on that same operator with the same context, next( ) is called on the forward-step with the same local-result as context.

When an invalidnode is received from the forward-step, the operator produces its next local-result, which is then passed to the forward-step->next( ) call as context. The sequence then repeats.

In order to generate the local-result, each operation utilizes its own produce( ) method. For example, a suitable produce( ) method for a ScanOp is represented as

```
ScanOp:produce(contextnode)
{
    if (cachedresult[contexnode.id])
        return cachedresult[contextnode.id].next( )
    else
        P = internalmap(contextnode.pathid)
        For each path p in P
            result = result + Store.scan(p)
        result.uniquesort( )
        cachedresult[contexnode.id] = result
        return cachedresult.next(contextnode.id)
}
```

Note that the internalmap being utilized is the one generated during Path Resolution.

By way of further example, a suitable produce( )method for a ParentOp is represented as

```
ParentOp::produce(contextnode)
{
    Store.parentscan(contextnode.id, contextnode.pathid)
}
Store::parentscan( nodeid, pathid)
{
    p = lookupParent( pathid)
    S = PathIndex.nodes(p)
    return largest s in S not greater than nodeid (using binary search)
}
```

With S being a set of nodes subscribing to the parent path (p) of the context node (e.g., with id n), the parent of n is the node with highest id s in S but not greater than n due to the in-order numbering of the nodes in the XML document.

As described, the relative path evaluation of the embodiments of the invention takes a single XML node, i.e., a context node and a relative path, and returns all the nodes matching the given relative path under the context node utilizing a forward scan. To do this efficiently, an auxiliary index summary structure built on top of the catalog speeds up identifying the set of absolute paths matching the given forward scan. With the results of the forward scans cached, computation is efficient when returning the nodes one at time to parent operators in the execution plan. Using these forward scans, a simple plan generation method is provided to evaluate XPath queries, including reverse axes that provides providing high performance and low resource usage by visiting only the relevant nodes in the XML document.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. The breadth and scope of the present invention should not be limited by any of the above-described exemplary embodiments, but should be defined only in accordance with the following claims and their equivalents.

What is claimed is:

1. A computer-implemented method for path-based query evaluation, the method comprising:
representing a markup language document as a descriptive catalog comprising an index of paths, wherein the index of paths includes a path identifier for each path;
capturing relationships from the index of paths in the descriptive catalog in a summary index including the path identifier of each path and a path identifier of a child path of each path; and
utilizing the index of paths and the summary index for evaluating a path-based query on the markup language document by using the index of paths on a node of the path-based query to identify at least one path and a corresponding path identifier in the descriptive catalogue, and using the summary index and the corresponding path identifier to identify at least one child path associated with the at least one path, wherein the identified at least one path and the at least one child path reduce a number of paths in an execution plan that evaluates the path-based query.

2. The computer-implemented method of claim 1, wherein the summary index comprises a number of child paths of each path mapped to the path identifier.

3. The computer-implemented method of claim 1, wherein the summary index includes a next path to each path in the index of paths, wherein the next path is mapped to the path identifier of each path.

4. The computer-implemented method of claim 3, further comprising utilizing the summary index to traverse forward and reverse tree axes, wherein the tree axes is associated with a tree version of the path-based query.

5. The computer-implemented method of claim 1, wherein the markup language comprises extensible markup language (XML).

6. The computer-implemented method of claim 1, wherein the path based query comprises an XPath query expression.

7. A system capable of path-based query evaluation, the system comprising:
storage for storing a markup language document; and
a processor coupled to the storage and configured to:
represent the markup language document as a descriptive catalog comprising an index of paths, wherein the index of paths includes a path identifier for each path;
capture relationships in the descriptive catalog as a summary index including the path identifier of each path and a path identifier of a child path of each path; and
utilize the index of paths and the summary index for evaluating a path-based query on the markup language document by using the index of paths on a node of the path-based query to identify at least one path and a corresponding path identifier in the descriptive catalogue, and using the summary index and the corresponding path identifier to identify at least one child path associated with the at least one path, wherein the identified at least one path and the at least one child path reduce a number of paths in an execution plan that evaluates the path-based query.

8. The system of claim 7, wherein the summary index comprises a number of child paths of each path mapped to the path identifier.

9. The system of claim 8, wherein the summary index includes a next path to each path in the index of paths, wherein the next path is mapped to the path identifier of each path.

10. The system of claim 9 wherein the processor is further configured to utilize the summary index to traverse forward and reverse tree axes, wherein the tree axes is associated with a tree version of the path-based query.

11. The system of claim 7, wherein the markup language comprises extensible markup language (XML).

12. The system of claim 7, wherein the path based query comprises an XPath query expression.

13. A computer program product including a non-transitory computer-readable medium having instructions stored thereon that, if executed by a computing device, cause the computing device to perform operations for path-based query evaluation, the operations comprising:
representing a markup language document as a descriptive catalog comprising an index of paths, wherein the index of paths includes a path identifier for each path;
capturing relationships from the index of paths in the descriptive catalog in a summary index including the path identifier of each path and a path identifier of a child path of each path; and
utilizing the index of paths and summary index for evaluating a path-based query on the markup language document by using the index of paths on a node of the path-based query to identify at least one path and a corresponding path identifier in the descriptive catalogue, and using the summary index and the corresponding path identifier to identify at least one child path associated with the at least one path, wherein the identified at least one path and the at least one child path reduce a number of paths in an execution plan that evaluates the path-based query.

14. The computer program product of claim 13, wherein the instructions further comprise operations, the operations comprising wherein the summary index comprises a number of child paths of each path mapped to the path identifier.

15. The computer program product of claim 13, wherein the summary index includes a next path to each path in the index of paths, wherein the next path is mapped to the path identifier of each path.

16. The computer program product of claim 15, wherein the instructions further comprise operations, the operations comprising utilizing the summary index to traverse forward and reverse tree axes, wherein the tree axes is associated with a tree version of the path-based query.

17. The computer program product of claim 13, wherein the markup language comprises extensible markup language (XML).

18. The computer program product of claim 13, wherein the path based query comprises an XPath query expression.

19. The method of claim 1, wherein paths in the index of paths are associated with unique path identifiers, one unique path identifier per path.

20. The method of claim 1, wherein the path identifier is associated with a first node in each path.

* * * * *